Aug. 7, 1934.    E. ANSEELE ET AL    1,969,442
DECORTICATING MACHINE FOR GRAIN, RICE, AND SIMILAR CEREALS
Filed Nov. 21, 1932
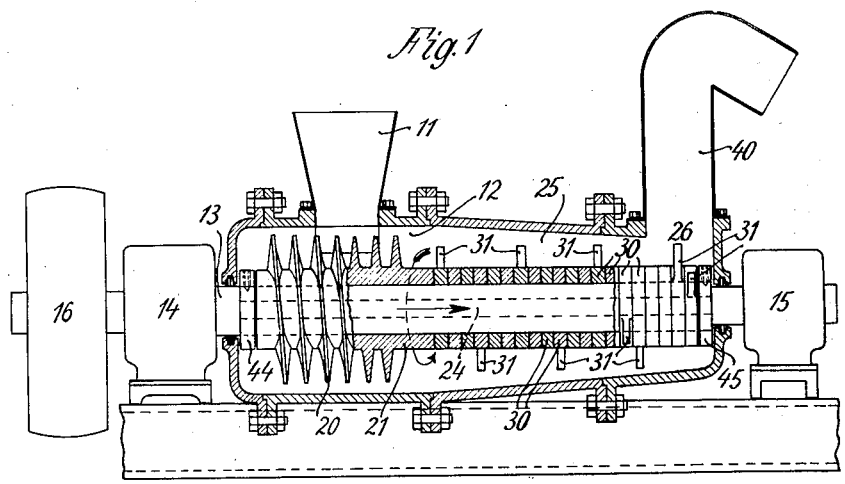
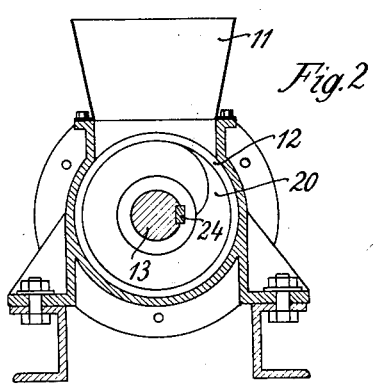
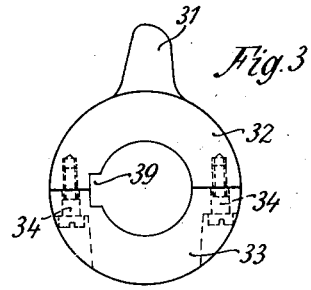
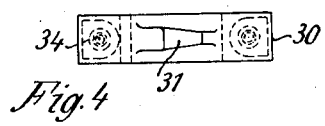
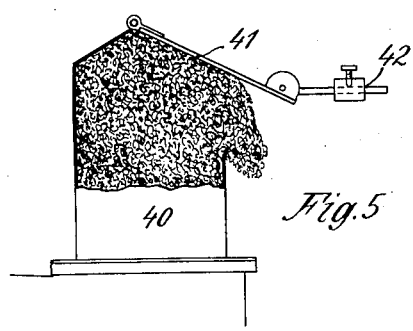
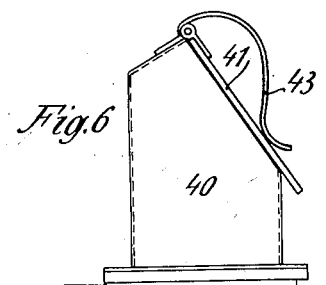
Inventors
Edouard Anseele
Maurice De Moor
By Beau & Brooks Attorneys Patented Aug. 7, 1934

1,969,442

UNITED STATES PATENT OFFICE 1,969,442

DECORTICATING MACHINES FOR GRAIN, RICE, AND SIMILAR CEREALS

Edouard Anseele and Maurice De Moor, Gand, Belgium, assignors to Société Anonyme "Les Ateliers Metallurgiques Réunis", Gand, Belgium, a corporation of Belgium Application November 21, 1932, Serial No. 643,717
In Germany November 11, 1931

4 Claims. (Cl. 83—30)

The invention relates to improvements in decorticating machines for grain, rice and similar cereals.

The object of the invention is to provide a machine, mill or apparatus for decorticating, husking or shelling cereals at a small expenditure of power and in such a way that neither parts of the shell or husk adhere to the kernel nor parts of the kernel, flour or meal to the shell.

The invention relates more specifically to that type of decorticating machine in which the grain or the like is pressed, conveyed and rolled round in a cylindrical or tapering container by means of a revolving conveyor worm and fingers or blades mounted on the central shaft journaled within the container.

In our improved machine, apparatus or device, the decorticating, husking or shelling of the grain, corn, rice and so on, is effected by fingers or blades arranged closely adjacent to one another and mounted on the shaft and displaced in relation to one another around the periphery of the shaft so as to form a helix or worm. The grain is thus conveyed by members distributed helically over the entire length of the machine, pressed strongly and rolled around itself, in such a manner that the individual grains are towards the end of the machine continuously subjected to a strong frictional pressure, which presses the individual grains against and rolls them in close contact with one another so that they are effectively decorticated or stripped off their husks or shells. This action may be further promoted by moistening the grain and thus, in consequence of the strong pressure and the friction to which the grain is subjected within the machine and the elevation of temperature combined therewith, and softening the grain. By arranging the fingers in a helical line on the revolving shaft the pressing of the individual grains initiated by the conveyor worm is continued right up to the discharge opening. The provision of the fingers spaced around the shaft and displaced in relation to one another so as to form a helix along the direction of the axis the decorticating action is improved to such an extent that further means, such as emery discs, beater blades and the like are rendered entirely superfluous.

According to another feature of our invention the fingers are given wedge shape so that the pressure to which the grain is subjected is further increased. A preferred construction of our improved apparatus results if the fingers are individually provided with hub rings or collars by means of which they may be beaded on the shaft as a set and keyed in place against rotation after having been correctly adjusted.

The invention will be best understood on referring to the drawing affixed to our specification and forming part thereof, which illustrates one construction of our improved decorticating machine by way of example.

In the drawing:

Fig. 1 the complete machine in longitudinal section,

Fig. 2 a cross-section through the end portion viewed in the direction of the worm, Fig. 3 a decorticating finger in elevation, Fig. 4 the same in plan, on an enlarged scale, Fig. 5 a pressure regulator in sectional elevation and Fig. 6 another pressure regulator in side elevation.

Referring to Figs. 1 and 2 of the drawing, 11 is the feed hopper of the machine through which the preferably moistened grain or the like is introduced into the chamber 12. In this chamber revolves a shaft 13 journaled in bearings 14, 15 and adapted to be driven in any suitable manner, for example by means of a pulley 16 and belt. On the shaft 13 within the chamber 12 is mounted a conveyor worm 20 the bushing or hub 21 of which is slipped over the shaft 13 and locked against rotation thereon by a key 24, Fig. 2.

By means of the worm 20 the grain filled into the chamber 12 is fed into a further chamber 25 which preferably tapers towards the discharge end 26 of the machine. In this section 25 of the machine chamber there are beaded on the shaft 13 rings or collars 30 which carry decorticating fingers 31. The fingers taper in cross-section in the direction of their rotation, indicated by an arrow in Fig. 1, as particularly clearly noticeable in Fig. 4.

The decorticating or stripping fingers are in the example illustrated arranged in a set of six in a circle so that each finger is displaced by an angle of 60 degrees in relation to the adjacent ones. The set of decorticating fingers thus forms a further helix, in the example illustrated with three threads. Due to this peculiar shape and arrangement of the stripping fingers the grain is strongly compressed in the helical feed direction. At the same time the grain is subjected to strong friction along the surfaces of the fingers, as well as the chamber walls, close to which the fingers sweep along, so that the individual grains roll upon one another and the shells or husks which have become soft due to the moistening and the heat generated by the strong pressure are freely stripped off the kernels.

The shelled grain is then forced into the discharge pipe 40 and hence passes to other machines for further treatment, removal of the husks by fans, flour mills and so on.

To obtain a favorable stripping action within the machine the grain is preferably kept under a predetermined permanent or variable pressure in the machine. This pressure is, on the one hand, determined by the pitch and the speed of the worm 20, on the other hand by the weight of the quantity of grain contained in the ascending discharge pipe 40. This pressure may be adjusted or regulated as desired by providing the apparatus with a pressure regulator or governor, preferably at the discharge pipe 40. Such a pressure regulator is shown in Fig. 5 of the drawing. On referring to this figure it will be seen that a pivotally mounted door or trap door 41 serves as pressure regulator and is adjustably pressed against the grain issuing from the discharge opening of the pipe 40 by means of a sliding weight 42.

Another modification of the pressure regulator is illustrated in Fig. 6, in which the pressure is produced by a preferably adjustable leaf spring, although a helical spring might naturally be used.

A particularly advantageous construction as regards manufacture and reliability of the machine results from the special arrangement of the stripping fingers, which in the preferred construction illustrated are not mounted directly upon the shaft but upon special rings or collars. All the fingers may thus be made exactly alike, for instance of steel or cast steel or as steel casting without any substantial machining, besides boring out the hub and milling the keyway 39.

The keyways in the constituent individual members are so displaced with reference to one another that the correct spacing of the decorticating fingers on the periphery of the shaft is obtained without any trouble. The fingers with their hub rings or collars are loosely threaded on to the shaft 13 provided with the feather key 24 and together with the worm 20 secured in their working position by means of the set collars 44, 45 located at the ends of the shaft 13.

The rings carrying the stripping fingers may be made in one piece, or as Figs. 3 and 4 show in two pieces 32, 33 joined by screws 34, for instance.

It will be readily understood that various constructional changes and modifications may be made in our improved decorticating machine without departing from the spirit of our invention.

Having thus described our invention, what we claim as new and desire to secure by Letters Patent, is:—

1. A machine for hulling, husking and decorticating grain, comprising in combination with a container of circular cross section and smooth interior surface; a central rotatable shaft extending through said container, a worm conveyor mounted on said shaft within one section of the container for passing the grain along said container into a second section thereof, and smoothly rounded grain rolling fingers mounted on said central shaft in a helical line within said second container section and spaced therefrom to define a grain receiving circumferential space between the ends of the fingers and the smooth inner wall surface of the container, said worm and fingers being arranged in a helical line forming a continuous helical conveying passage for moving the grain into the circumferential space provided between the ends of the fingers and the smooth inner surface of the container wall, and adapted to cooperate with the interior surface of the container to produce a rolling pressure on the grains increasing from the feeding end to the discharge end whereby the grain elements are squeezed into the said space and caused to roll against each other for hulling, husking and decorticating them, said squeezing and rolling action being primarily due to the conveyor pressure and to the rotation of the shaft and said squeezing, rolling and conveying action being assisted by said fingers in said second section.

2. In a decorticating machine as set forth in claim 1, said decorticating fingers having a cross sectional configuration tapering in a transverse direction as distinguished from an axial direction with respect to the central rotatable shaft.

3. A decorticating machine for treating grain, rice and other similar materials, comprising in combination with a cylindrical container of smooth interior surface and a rotatable worm conveyor for pressing, conveying and rolling the cereal, rings mounted in axial alinement with the worm conveyor, a shaft rotatably supporting the worm conveyor and rings in the container whereby the cereals are fed from the conveyor to the space about the rings, decorticating fingers provided rigidly on the rings, and having rounded and outwardly tapering smooth surfaces for rolling the grain along the smooth inner surface of the container wall, said shaft and rings having key and keyway structure for securing said rings in their relative position and locking them against rotation upon the shaft, said rings being arranged closely adjacent one another and said fingers being displaced in relation to one another around the periphery of the shaft substantially in a helical path, said helical path of arrangement of the fingers and said helical formation of the worm being substantially uniform from one end portion of the container to the other for moving the grains into the circumferential space provided between the ends of the fingers and the container wall and adapted to cooperate with the interior surface of the container to produce a rolling pressure on the grains increasing from the feeding end to the discharge end of the container.

4. In a decorticating machine for treating grain, a cylindrical container having a smooth interior surface and having a rotatable shaft mounted substantially axially therein, said container having a grain feeding end and a discharge end, a worm conveyor rigidly carried by the shaft for forcing grain from one end of the container toward its other end, fingers having smooth rounded surfaces for rolling the grain, means for mounting the fingers upon the shaft in a substantially helical path inside the container to receive grain fed thereagainst by the worm conveyor, said helical formation of the worm and path of arrangement of the fingers being substantially continuous from one end portion of the container to the other and in spaced relation from the inner wall surface of the container, and an upright conduit connected to the discharge end of the container for receiving the treated grain in an upwardly moving stream whereby the weight of the grain provides back pressure in the container to cause close rubbing of the grain elements against one another and against the conveyor and container surfaces, and means for regulating the back pressure in said conduit.

E. ANSEELE.
M. DE MOOR.